US006396999B1

(12) United States Patent
Van Gestel

(10) Patent No.: US 6,396,999 B1
(45) Date of Patent: May 28, 2002

(54) RECORDING DEVICE FOR RECORDING A DIGITAL INFORMATION SIGNAL ON A RECORD CARRIER

(75) Inventor: Wilhelmus J. Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/415,159

(22) Filed: Oct. 8, 1999

(30) Foreign Application Priority Data

Oct. 12, 1998 (EP) .............................. 98203440

(51) Int. Cl.[7] ................................ H04N 5/91
(52) U.S. Cl. ............................ 386/68; 386/46; 386/81
(58) Field of Search ............................. 386/46, 52, 68, 386/81, 82, 109, 111, 124, 125–126, 6–8, 92, 95; H04N 5/51

(56) References Cited

U.S. PATENT DOCUMENTS

| | | | | |
|---|---|---|---|---|
| 5,680,266 A | * | 10/1997 | Park | 386/112 |
| 5,684,917 A | * | 11/1997 | Yanagihara et al. | 386/80 |
| 5,835,674 A | * | 11/1998 | Timmermans | 386/125 |
| 5,867,625 A | * | 2/1999 | McLaren | 386/68 |
| 5,889,918 A | * | 3/1999 | Sakazaki et al. | 386/68 |
| 5,892,883 A | * | 4/1999 | Bruls et al. | 386/81 |
| RE37,312 E | * | 8/2001 | Takakura | 386/124 |

FOREIGN PATENT DOCUMENTS

EP 0 820 192 A1 * 1/1998 ............ H04N/5/92

OTHER PUBLICATIONS

"An experimental consumer recorder for MPEG–coded video signals" by R.W.J.J. Saeijs, P.H.N. de With, A.M.A. Rijckaert and C. Wong, in IEEE Transactions on Consumer Electronics, vol. 41, No. 3, Aug., 1995, pp. 651–661.

* cited by examiner

Primary Examiner—Vincent F. Boccio
(74) Attorney, Agent, or Firm—Edward W. Goodman

(57) ABSTRACT

A recording device writes a multiple video stream and a corresponding trick-mode data signal on a record carrier. The recording device includes a selector for selecting at least two video streams from at least one multiple video stream, a trick-mode data generating unit for generating a trick-mode data signal, and a write unit for writing the selected video streams and the trick-mode data signal in a normal-play area or in a trick-play area on the record carrier. The trick-mode data generating unit is adapted to generate, for all the selected video streams, a corresponding trick-mode signal and to combine the corresponding trick-mode signals to a trick-mode data signal. The trick-mode data signal represents a mosaic image that can be displayed by a reproducing device.

8 Claims, 3 Drawing Sheets

RECORDING DEVICE FOR RECORDING A DIGITAL INFORMATION SIGNAL ON A RECORD CARRIER

BACKGROUND OF THE INVENTION

1. Field of the Invention

The invention relates to a recording device for recording a video stream and a trick-mode data signal on a record carrier, the recording device including:

receiving means for receiving an input signal comprising at least one information signal, selection means for selecting a first video stream from an information signal, trick-mode data generating means for deriving a trick-mode data signal, write means for recording the first video stream in a normal-play area on the record carrier and the trick-mode data signal in trick-mode area on the record carrier.

The invention also relates to a method of recording a video stream and a trick mode data signal on a record carrier.

2. Description of the Related Art

A recording device of the type defined in the opening paragraph, is known from IEEE Transactions on Consumer Electronics, Vol. 41. No. Aug. 3, 1995, "An experimental consumer recorder for MPEG-coded video signals". In the known device, one program is selected from a digital information signal, in the form of an MPEG signal, this MPEG signal containing a plurality of programs. The trick-mode data generating means derive a trick-mode data signal from the selected program. The trick-mode data signal is intended for reproduction of the selected program by a reproducing device with a reproducing speed other than, for example, higher than, the normal reproducing speed. A user can then view parts of a program which are of less interest more quickly by means of a trick-mode data signal, and can subsequently view a more interesting part of the program at the normal speed by reproduction of the video stream. The selected program is recorded on a record carrier together with the trick-mode data signal.

SUMMARY OF THE INVENTION

It is an object of the invention to provide a device of the type defined in the opening paragraph, which is capable of recording more than one program of the available programs in a manner described hereinbefore.

To this end, a recording device in accordance with the invention is characterized in that the selection means is further adapted to select at least a second video stream from an information signal, the trick-mode data generating means are adapted to:
derive trick-mode images associated with each of the selected video streams,
combine the trick-mode images of each of the selected video streams to the trick-mode data signal, the write means are further adapted to record the at least two selected video streams in the normal-play area on the record carrier.

A recording device having said characteristic features has the advantage that it generates one trick-mode data signal, this trick-mode data signal being recorded in the trick-play area on the record carrier, as is known from the state of the art. The trick-mode data signal in the trick-play area can be read and reproduced by means of a known reproducing device.

It would be possible to generate a separate associated trick-mode data signal for each selected video stream. Each trick-mode data signal should then be recorded in a separate trick-play area. In order to enable the separate trick-mode data signals to be reproduced, a reproducing device should have special provisions enabling the separate trick-play areas to be read in a trick-play mode. Another disadvantage of one trick-mode data signal per selected video stream and, consequently, the number of separate trick-play areas, is that the amount of space required for the trick-mode data signals increases as a linear function of the number of recorded video streams. For each selected video stream, a part of the storage capacity on the record carrier is utilized as trick-play area for the trick-mode data signal associated with said selected video stream. The total storage capacity on the record carrier available for use as normal-play area decreases because the size of the area used for the individual trick-mode data signals increases.

The information signals applied to an input of the recording device together form the input signal. An information signal can be a channel on a cable system or a satellite. If the information signal takes the form of an MPEG program stream or MPEG transport stream, the information signal may contain more than one video stream. A recording device in accordance with the invention is adapted to select at least two video streams. These video streams may originate from different channels or from, for example, one MPEG transport stream. If, for example, three video streams are selected, two video streams may originate from an information signal in the form of an MPEG transport stream, and one video stream may originate from another information signal. In an embodiment of the recording device, in accordance with the invention, the trick-mode images of the selected video streams are combined to one mosaic image. The number of images in the mosaic screen depends on the number of selected video streams.

An embodiment of the recording device, in accordance with the invention, is adapted to reduce the size of the trick-mode images of the images corresponding to the selected video streams. An advantage of reducing the size of the trick-mode images is that the amount of information for the trick-mode images per selected video stream is reduced. When the trick-mode images are reduced in size by a factor which corresponds to the number of selected video streams, the amount of information of the trick-mode data signal will remain substantially the same and will not depend on the number of selected video streams. As a result of this, the trick-mode data signal may be recorded in the trick-play area on the record carrier without the area on the record carrier being extended.

A further embodiment of the recording device, in accordance with the invention, is characterized in that the image-selection means is adapted to generate the trick-mode images from at least some of the I images from each of the selected video streams. The I images in an MPEG signal contain all the information required for generating a video image, in contradistinction to the P and B images in the MPEG signal, which require at least the information from another image, for example, an I image. The use of I images for the generation of trick-mode images has the advantage that the trick-mode images can be further reduced in a comparatively simple manner, for example, by sub-sampling, as a result of which, the reduced trick-mode images of a selected video stream can be arranged at a predetermined location in the mosaic image.

Another embodiment of a recording device, in accordance with the invention, is characterized in that the write means is adapted to record a serial data stream comprising packets of information of the at least two selected video streams in the form of a number of normal-play signals corresponding to the selected number of video streams, and information of the trick-mode data signal in the form of a trick-play signal, respectively, in the normal-play area and in the trick-play area on the record carrier. Since the recording device generates an MPEG-2 output signal, the recorded information, including the trick-mode signal, can be processed by known reproducing devices capable of processing MPEG-2 signals. This has the advantage that the known reproducing device can process the trick-mode data in the same way as the other data streams. No additional means are required for reproducing the trick-mode data in the form of mosaic images.

A method in accordance with the invention is characterized in that the method further comprises the steps of:

selecting at least a second video stream from an information signal, recording the at least two selected video streams in the normal-play area on the record carrier, and the step of deriving the trick-mode data signal comprises the following sub-steps:

deriving trick-mode images associated with each of the selected video streams, combining the trick-mode images of each of the selected video streams to the trick-mode data signal.

BRIEF DESCRIPTION OF THE DRAWINGS

These and other aspects of the invention will be described in further detail with reference to the drawings in which.

DESCRIPTION OF THE PREFERRED EMBODIMENTS

Figure 1:
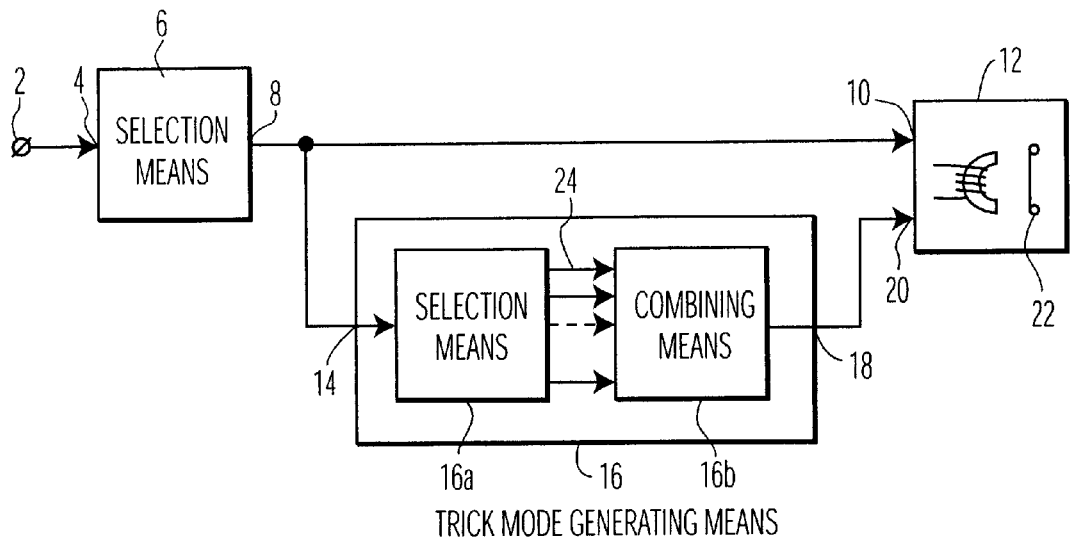
FIG. 1 is a block diagram of an embodiment of a recording device in accordance with the invention.
Figure 5:
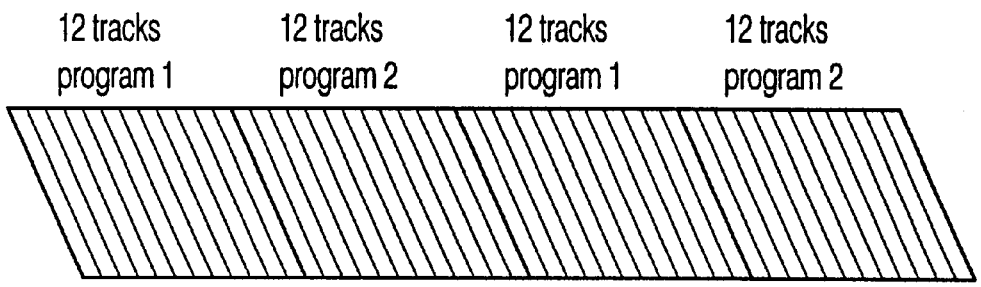
FIG. 5 shows a first example of recording two video streams on a record carrier.
Figure 6:
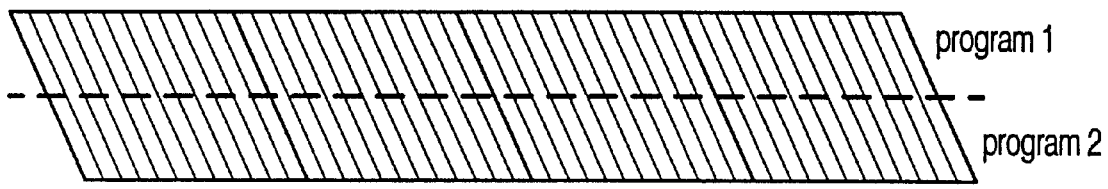
FIG. 6 shows a second example of recording two video streams on a record carrier.

FIG. 1 is a block diagram of an embodiment of a recording device in accordance with the invention. The recording device has an input terminal 2 for receiving an input signal which comprises at least one information signal. An information signal is, for example, a signal obtained from a community antenna system. This signal comprises a plurality of channels. Each channel corresponds to one information signal. A received information signal includes at least one video stream. The received information signals may take the form of MPEG encoded, information signals. An MPEG encoded, information signal in the form of an MPEG transport stream may include a plurality of video streams. The video streams in an MPEG transport stream are present in the information signal in time-multiplexed form. The input terminal 2 is coupled to an input 4 of selection means 6. The selection means 6 is adapted to select at least two video streams from the received information signals in order transfer them to an output 8. The output 8 of the selection means 6 is coupled to a first input 10 of the write means 12, and to an input 14 of trick-mode data generating means 16. The trick-mode data generating means 16 is adapted to derive a trick-mode data signal from the at least two selected video streams for transfer to an output 18. The output 18 of the trick-mode data generating means 16 is coupled to a second input 20 of the write means 12. The write means 12 is adapted to record the at least two selected video streams and the trick-mode data signal on a record carrier 22 in a normal-play area and a trick-play area, respectively. The record carrier 22 may take the form of, for example, a tape or a disc. WO 98/34226 corresponding to U.S. patent application Ser. No. 09/155,748, filed Oct. 5, 1998; (PHN 16.614) describes an example of the trick-play format of the trick-play area on a record carrier. FIG. 5 herein shows a first example for the recording of two video streams on a record carrier. Alternately, an ECC block of the first or the second video stream is generated. Each ECC block is subsequently written in the next twelve tracks on the record carrier. As a result of this, the record carrier recurrently contains an ECC block with information of the first video stream followed by an ECC block with information of the second video stream. FIG. 6 shows a second example for the recording of two video streams on a record carrier. Each ECC block in the present example contains information of the first and the second video stream, the first video stream being recorded in a first track portion/track half of the tracks and the second video stream being recorded in a second track portion of the tracks.

The trick-mode data generating means 16 include image selection means 16a and image combination means 16b. The image selection means 16a is adapted to generate trick-mode images associated with each of the selected video streams. A sequence of trick-mode images 24 is derived individually from each of the selected video streams. If the received information signal takes the form of an MPEG-encoded signal, the trick-mode images can be obtained by selecting at least some of the I images from the selected video stream.

Figure 2:
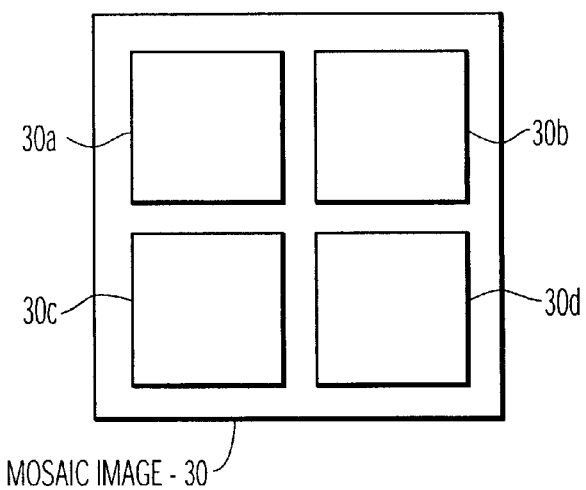
FIG. 2 shows an example of a trick-mode image generated by a recording device in accordance with the invention, FIGS. 3a and 3b diagrammatically show the selection of video streams from a digital information signal.

The image combination means 16b are adapted to combine the sequences of trick-mode image 24 to from the trick-mode data signal. The trick-mode data signal is transferred to the output 18 of the trick-mode data generating means 16. FIG. 2 shows an example of an image of the trick-mode data signal generated by a recording device in accordance with the invention. The image 30 is displayed as a mosaic image. The mosaic image in FIG. 2 is made up of a plurality of windows 30a, 30b, 30c and 30d. The number of windows depends on the number of video streams selected from the digital information signal. The windows 30a, 30b, 30c and 30d may contain trick-mode images of the first, the second, the third and the fourth selected video streams, respectively.

In a first example of the image combination means 16b, the images of the sequences of trick-mode images are combined to the mosaic image. The trick-mode data signal now comprises a sequence of mosaic images. In the image combination means 16b, the images of the sequences of trick-mode images are reduced in size to form reduced images. The reduced images of the sequences of trick-mode images are subsequently combined to form the aforementioned mosaic image. The size reduction can be achieved by removing a number of pixels in a row and a number of rows from a trick-mode image of the selected video streams. For example, when four video streams are selected, the number of pixels in a row and the number of rows will be halved. In the present example of the image combination means 16b, a trick-mode data signal is generated whose number of bits for the trick-mode data signal is virtually independent of the number of selected video streams.

If the selected video streams take the form of an MPEG signal, the number of bits of the sequence of trick-mode images can be reduced by removing a number of AC coefficients of each DCT block of the selected I images. A DCT block defines for example, a block of 8*8 pixels. By removing the AC coefficients, the resolution of the I image is reduced. If all the AC coefficients have been removed, the DC coefficient of the DCT block is left. A block of 8*8 pixels defined by the DC coefficient only can simply be reduced to, for example, a block 4*4 pixels by sub-sampling. However, it is also possible to sub-sample and to take along, a number of AC coefficients. When the AC coefficients are taken along the pixels belonging to a DCT block have different values.

Figure 3A:
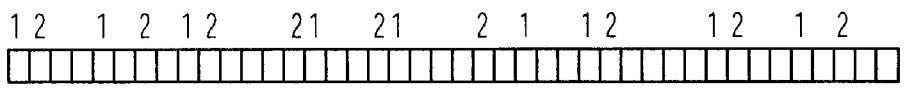
Figure 3B:
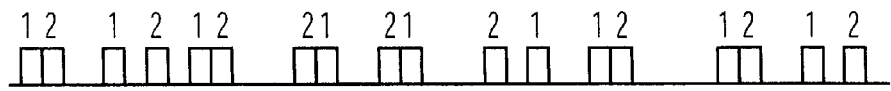

FIGS. 3a and 3b diagrammatically illustrate the selection of two video streams from a received information signal. FIG. 3a shows the received information signal comprising packets of information of at least three video streams, which are received serially at the input of the recording device in FIG. 1. The packets alternately belong to another video stream. Each packet contains an indication which defines to which video stream it belongs. The packets belonging to a first video stream or a second video stream respectively, have the indications 1 or 2. FIG. 3b shows the signal appearing on the output 8 of the selection means 6. This signal comprises only packets of information of the first and the second video stream. The write means record these packets in the normal-play area on the record carrier.

Figure 4:
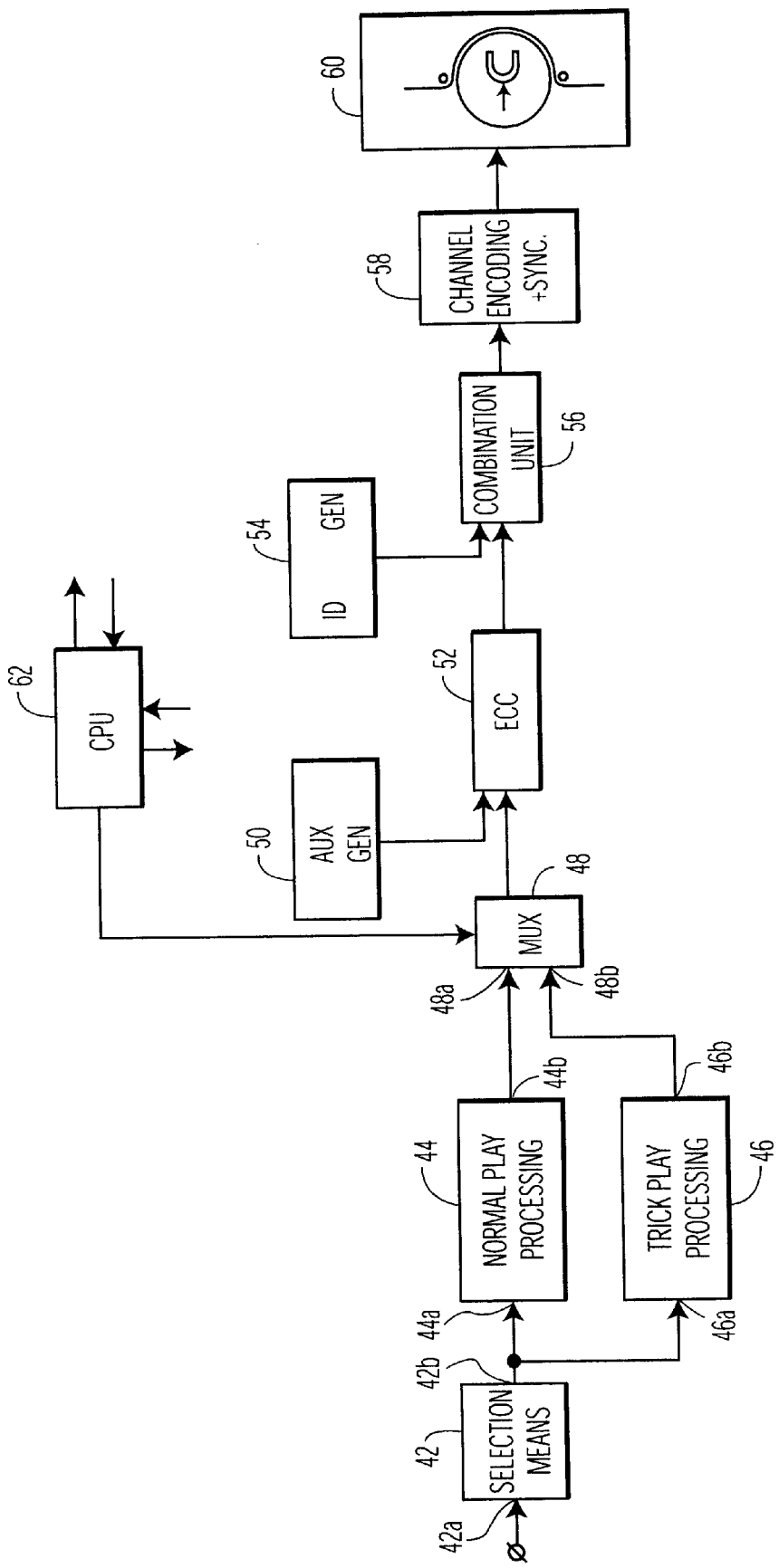
FIG. 4 is a more detailed block diagram of the embodiment of the recording device shown in FIG. 1.

FIG. 4 shows a more detailed block diagram of the embodiment of a recording device shown in FIG. 1. The recording device has an input terminal 40 for receiving at least one information signal. The information signal may take the form of an MPEG encoded, signal and contains at least one video stream. The input terminal 40 is coupled to an input 42a of the selection means 42. The selection means 42 is adapted to select at least two video streams from the at least one information signal received, in order to transfer these to an output 42b. The output 42b of the selection means is coupled to an input 44a of a normal-play processing unit 44, and an input 46a of trick-mode data generating means 46. An output 44b of the normal-play processing unit 44 and an output 46b of the trick-mode data generating means 46 are coupled to, respectively, a first input 48a and a second input 48b of a multiplex unit 48.

Auxiliary signal generating means 50 has been provided for the generation of an auxiliary signal to be stored on the record carrier. The outputs of the multiplex unit 48 and the auxiliary signal generating means 50 are coupled to the corresponding inputs of an error correction encoding unit 52 adapted to carry out an error correction encoding step, referred to as ECC. The error correction encoding step is required to enable error detection and error correction in a reproducing device which is not described in further detail.

The recording device further includes generating means 54 for the generation of ID information and sub-code information. A signal combination unit 56 combines an error correction encoded signal generated by the error correction encoding unit 52, the ID information and the sub-code information, for application to a channel encoding unit 58. The channel encoding unit 58 is adapted to channel-encode the applied signal and to add synchronization information.

The channel encoding performed in the channel encoding unit 58 is generally known U.S. Pat. No. 5,142,421 (PHN 13.537) describes a possible example of the channel encoding unit 58. The document also shows an example of adding the synchronization information to the data stream.

The channel encoding unit 58 has an output coupled to a write unit 60. The write unit 60 is adapted to record the data stream received from the channel encoding unit 58 on the record carrier.

A central processing unit 62, referred to as CPU, has been provided in order to control various signal processing steps. This is illustrated by the outgoing and incoming arrows in FIG. 4. The central processing unit 62 controls the multiplex unit 48 so as to combine the trick-mode data signal and the selected video streams, as a result of which a serial data stream is generated which comprises packets of information of trick-play data and packets of information of the selected video streams.

The normal-play processing unit 44 is not described in further detail. Such a description is not relevant for understanding the present invention. An extensive description of a normal-play unit for the recording of an MPEG information signal is given in U.S. Pat. No. 5,579,183 (PHN 14.818).

The trick-mode data signal can be obtained from the signal of the selected video streams at the output of the selection means 42. However, the trick-mode data signal is also a video stream. Therefore, the trick-mode data signal can also be obtained via a DCT encoder which may be present in the normal-play processing unit 44 or can be obtained via an MPEG intra encoder. The normal-play data signal applied to the first input 48a can also be used for deriving the trick-mode data signal. If the normal-play data signal is an MPEG signal, the trick-mode data signal can be composed of at least some of the I images of all the selected video streams.

It is to be noted that the trick-mode data signal, which has been recorded by means of a recording device, in accordance with the invention, in the trick-play area on a record carrier, can be reproduced by means of a standard reproducing device. In the case of FIG. 2, this means that in the trick-play mode, a mosaic screen is displayed which contains reduced-size images of the video streams recorded on the record carrier. However, it is possible that a reproducing device includes means which enable a part of the mosaic image formed by the trick-mode data signal to be reproduced separately. When a user views a selected video stream and sets the reproducing device to the trick-play mode, the window with the reduced-size trick-mode images of the selected video stream will be blown up to the full-size image and will subsequently be displayed. However, the resolution of the images is lower than that of the images in the normal-play mode.

What is claimed is:
1. A recording device for recording a video stream and a trick-mode data signal on a record carrier, said recording device comprising:
receiving means for receiving an input signal comprising at least one information signal;
selection means for selecting a first video stream from an information signal;
trick-mode data generating means for deriving a trick-mode data signal from said first video stream; and
write means for recording the first video stream in a normal-play area on the record carrier and the trick-mode data signal in a trick-mode area on the record carrier, characterized in that the selection means further selects at least a second video stream from an information signal, and the trick-mode data generating means comprises:
means for deriving trick-mode images associated with each of the selected video streams; and
means for combining the trick-mode images of each of the selected video streams to form the trick-mode data signal, wherein the write means further records the at least two selected video streams in the normal-play area on the record carrier.

2. The recording device as claimed in claim 1, characterized in that the trick-mode data generating means further comprises means for reducing the trick-mode images associated with each of the selected video streams to a reduced-size version, said combining means combining the reduced-size versions of all the selected video streams to form the trick-mode data signal.

3. The recording device as claimed in claim 2, characterized in that the trick-mode data signal contains mosaic images made up of the reduced-size versions of the trick-mode images of all the selected video streams.

4. The recording device as claimed in claim 1, characterized in that the information signal includes at least one video stream.

5. The recording device as claimed in claim 1, characterized in that the selection means also selects at least two video streams from one information signal.

6. The recording device as claimed in claim 1, in which the video streams are MPEG-encoded video streams comprising I images, P images and B images, characterized in that the image-selection means comprises means for generating the trick-mode images from at least some of the I images from each of the selected video streams.

7. The recording device as claimed in claim 1, characterized in that the write means records a serial data stream comprising packets of information of the at least two selected video streams in the form of a number of normal-play signals, corresponding to the selected number of video streams, and information of the trick-mode data signal in the form of a trick-play signal, respectively, in the normal-play area and in the trick-play area on the record carrier.

8. A method of recording a video stream and a trick-mode data signal on a record carrier, said method comprising the steps:

receiving an input signal, said input signal including at least one information signal;

selecting a first video stream from an information signal;

deriving a trick-mode data signal from the selected video stream; and recording the first video stream in a normal-play area on the record carrier and the trick-mode data signal in a trick-mode area on the record carrier, characterized in that the method further comprises the steps:

selecting at least a second video stream from an information signal; and recording the at least two selected video streams in the normal-play area on the record carrier, wherein the step of deriving the trick-mode data signal comprises the following sub-steps:

deriving trick-mode images associated with each of the selected video streams; and combining the trick-mode images of each of the selected video streams to form the trick-mode data signal.

\* \* \* \* \*